(12) United States Patent
Wang et al.

(10) Patent No.: US 10,990,784 B2
(45) Date of Patent: Apr. 27, 2021

(54) SIGNAL RECEIVING CIRCUIT AND DRIVING METHOD THEREOF, DISPLAY PANEL AND DISPLAY APPARATUS

(71) Applicant: BOE TECHNOLOGY GROUP CO., LTD., Beijing (CN)

(72) Inventors: Qiang Wang, Beijing (CN); Libin Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/378,201

(22) Filed: Apr. 8, 2019

(65) Prior Publication Data
US 2019/0392188 A1  Dec. 26, 2019

(30) Foreign Application Priority Data
Jun. 20, 2018 (CN) .......................... 201810634515.5

(51) Int. Cl.
*G06K 9/00* (2006.01)
*G01S 7/52* (2006.01)
*G06F 3/043* (2006.01)

(52) U.S. Cl.
CPC ........ *G06K 9/0002* (2013.01); *G01S 7/52023* (2013.01); *G06F 3/043* (2013.01); *G06K 9/00885* (2013.01)

(58) Field of Classification Search
CPC .............. G06K 9/0002; G06K 9/00885; G01S 7/52023; G01S 15/8925; G06F 3/043
See application file for complete search history.

(56) References Cited

U.S. PATENT DOCUMENTS 9,355,597 B2   5/2016  Yang
2014/0354597 A1*  12/2014  Kitchens, II .......... G06F 3/043
                                              345/175
(Continued)

FOREIGN PATENT DOCUMENTS

CN     103258501 A    8/2013
CN     106537313 A    3/2017
(Continued)

OTHER PUBLICATIONS

Liao, Yi-Huan et al., "Flat Panel Fingerpring Optical Sensor Using TFT Technology," Institute of Electrical and Electronics Engineers 2015.
(Continued)

*Primary Examiner* — Jonathan A Boyd
(74) *Attorney, Agent, or Firm* — McDermott Will & Emery LLP

(57) ABSTRACT

The present disclosure provides a signal receiving circuit and a driving method thereof, a display panel, and a display apparatus. The signal receiving circuit includes a reset circuit having an input terminal connected to a reference signal line for providing a reference voltage signal, a control terminal connected to a reset signal line providing a reset signal, and an output terminal connected to a collection node, the reset circuit being configured to control a voltage of a signal at the collection node under control of the reset signal; and an output circuit having an input terminal connected to the collection node, configured to accumulatively amplify the signal at the collection node and output the amplified signal.

13 Claims, 12 Drawing Sheets

(56) References Cited

U.S. PATENT DOCUMENTS

| | | | |
|---|---|---|---|
| 2015/0028766 A1* | 1/2015 | Yang | G09G 3/3233 |
| | | | 315/240 |
| 2017/0364188 A1 | 12/2017 | Bae et al. | |
| 2018/0203046 A1* | 7/2018 | Takemura | H01L 27/1255 |
| 2018/0300527 A1* | 10/2018 | Wang | G06K 9/0004 |
| 2019/0279566 A1 | 9/2019 | Wang et al. | |

FOREIGN PATENT DOCUMENTS

| | | |
|---|---|---|
| CN | 107204172 A | 3/2017 |
| CN | 106971172 A | 7/2017 |
| CN | 107092900 A | 8/2017 |

OTHER PUBLICATIONS

Office Action issued in corresponding Chinese Patent Application No. 201810634515.5, dated Jun. 28, 2020.

\* cited by examiner

SIGNAL RECEIVING CIRCUIT AND DRIVING METHOD THEREOF, DISPLAY PANEL AND DISPLAY APPARATUS

CROSS-REFERENCE TO RELATED APPLICATION(S)

This application claims priority to Chinese Application No. 201810634515.5, entitled "Signal Receiving Circuit And Driving Method Thereof, Display Panel And Display Apparatus" and filed on Jun. 20, 2018, which is incorporated herein by reference in its entirety.

TECHNICAL FIELD

The present disclosure relates to the field of fingerprint recognition technologies, and in particular, to a signal receiving circuit and a driving method thereof, a display panel, and a display apparatus.

BACKGROUND

Due to the uniqueness of the fingerprint pattern, the developed fingerprint recognition technology is widely used for personal identity authentication. According to the different methods of fingerprint collection and fingerprint input, the current fingerprint recognition technologies may include: optical imaging, thermo-sensitive sensor imaging, ultrasonic imaging, and the like. The ultrasonic fingerprint imaging has become a research hotspot due to its strong signal penetration without the need for a demanding protective layer.

SUMMARY

The present disclosure provides a signal receiving circuit and a driving method thereof, a display panel, and a display apparatus.

According to an aspect of the present disclosure, a signal receiving circuit is provided, including:

a reset circuit having an input terminal connected to a reference signal line for providing a reference voltage signal, a control terminal connected to a reset signal line providing a reset signal, and an output terminal connected to a collection node, the reset circuit being configured to control a voltage of a signal at the collection node under control of the reset signal; and an output circuit having an input terminal connected to the collection node, the output circuit being configured to accumulatively amplify the signal at the collection node and output the amplified signal at an output terminal of the signal collection circuit.

In an embodiment, the reset circuit includes a first transistor, and the first transistor has a gate connected to the reset signal line, a first electrode connected to the reference signal line, and a second electrode connected to the collection node; and the first transistor is configured to compensate for the voltage of the signal at the collection node with the reference voltage signal.

In an embodiment, the reset circuit further includes a second transistor; and the second transistor has a gate connected to the reset signal line, a first electrode connected to the reference signal line, and a second electrode connected to the collection node.

In an embodiment, the first transistor is a depleted thin film transistor, and the second transistor is an enhanced thin film transistor.

In an embodiment, the output circuit includes a third transistor and a fourth transistor; wherein the third transistor has a gate connected to the collection node, a first electrode connected to a power supply line for providing a power supply voltage, a second electrode connected to a first electrode of the fourth transistor; and the third transistor is configured to accumulatively amplify the signal at the collection node; and the fourth transistor has a gate connected to a control signal line for providing a control signal and a second electrode connected to the output terminal of the signal receiving circuit; and the fourth transistor is configured to output the amplified signal under control of the control signal.

In an embodiment, the first to fourth transistors are N-type thin film transistors.

In an embodiment, the signal receiving circuit according to the embodiment of the present disclosure further includes a holding circuit having a first terminal connected to the reference signal line and a second terminal connected to the output terminal of the signal receiving circuit; and the holding circuit is configured to hold the voltage at the output of the signal receiving circuit using the reference voltage signal.

In an embodiment, the signal receiving circuit according to the embodiment of the present disclosure further includes a signal conversion part configured to convert the received input signal into an electrical signal and output to the collection node.

In an embodiment, the input signal is an ultrasonic signal.

In an embodiment, the signal conversion part is a piezoelectric thin film.

According to another aspect of the present disclosure, a display panel is provided, including:

a plurality of signal receiving circuits according to any of the embodiments of the present disclosure arranged in an array in a display area of the display panel.

According to another aspect of the present disclosure, a display apparatus is provided, including the display panel according to any of the embodiments of the present disclosure.

According to another aspect of the present disclosure, a method of driving a signal receiving circuit is provided, including:

during a first time period, applying the reset signal so as to set the collection node to a voltage of the reference voltage signal;

during a second time period, applying the control signal so as to accumulatively amplify the voltage of the signal at the collection node and output the amplified voltage.

In an embodiment, the first transistor and the second transistor are turned on under the control of the reset signal during the first time period.

In an embodiment, the first transistor compensates for the voltage of the signal at the collection node with the reference voltage signal under the control of the reset signal during the first time period.

In an embodiment, the reset signal is at a first level, and the control signal is at a second level different from the first level.

BRIEF DESCRIPTION OF THE DRAWINGS

The above and other objects, features and advantages of the embodiments of the present invention will become apparent from the accompanying drawings. It should be noted that the same elements are denoted by the same or similar reference numerals throughout the drawings, in which.

DETAILED DESCRIPTION

Figure 1:
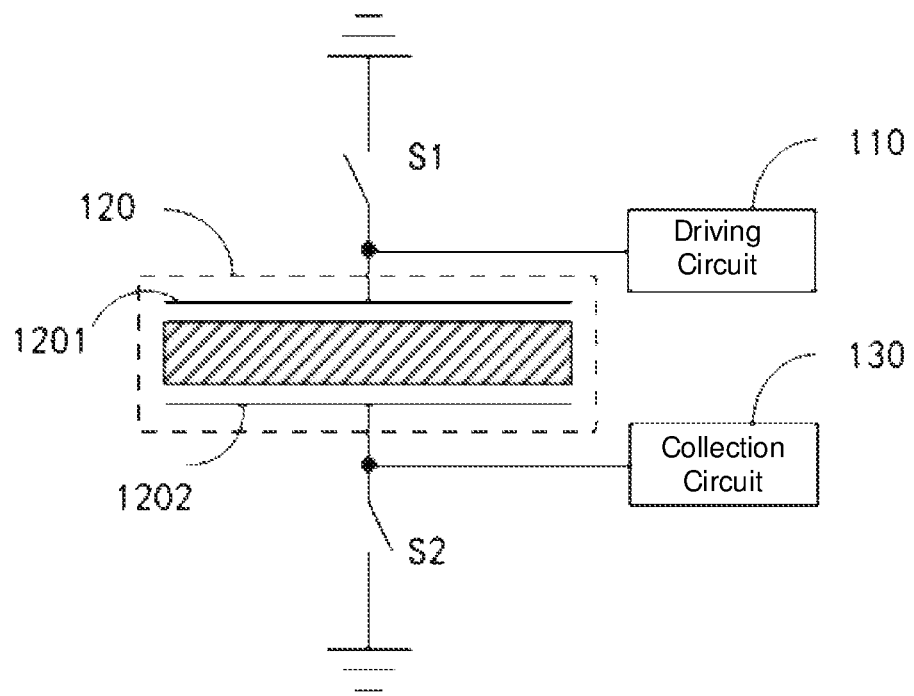
FIG. 1 shows a schematic structure diagram of an ultrasonic fingerprint recognition system.

In order to make the objects, technical solutions and advantages of the embodiments of the present disclosure more clear, the technical solutions in the embodiments of the present disclosure will be clearly and completely described below in conjunction with the drawings in the embodiments of the present disclosure. It is apparent that the described embodiments are parts but not all of the embodiments of the present disclosure. All other embodiments obtained by the skilled in the art without creative efforts based on the described embodiments of the present disclosure fall into the scope of the present disclosure. In the following description, some specific embodiments are for illustrative purposes only, but are not to be construed as limiting the present disclosure. Conventional structures or constructions will be omitted when they may cause confusion to the understanding of the present disclosure. It should be noted that the shapes and sizes of the various components in the drawings do not reflect the true sizes and proportions, but merely illustrate the contents of the embodiments of the present disclosure.

Technical or scientific terms used in the embodiments of the present disclosure should be of common meanings as understood by the skilled in the art, unless otherwise defined. The terms "first", "second" and similar words used in the embodiments of the present disclosure do not represent any order, quantity, or importance, but are merely used to distinguish different components.

Further, in the description of the embodiments of the present disclosure, the term "connected to" or "connected" may mean that two components are directly connected, or that two components are connected via one or more other components. In addition, the two components may be connected or coupled in a wired or wireless way.

Depending on different functions, the transistors used in the embodiments of the present disclosure may include a switching transistor and an amplifying transistor. Both the switching transistor and the amplifying transistor may be thin film transistors or field effect transistors or other devices having the same characteristics.

In the embodiment of the present disclosure, the source and the drain of the switching transistor are used symmetrically, thus the source and the drain thereof are interchangeable. In the embodiment of the present disclosure, according to the functions thereof, the gate is referred to as a control electrode, one of the source and the drain is referred to as a first electrode, and the other of the source and the drain is referred to as a second electrode.

Further, in the description of the embodiments of the present disclosure, the terms "first level" and "second level" are only used to distinguish different magnitudes of the two levels. For example, the description will be made by taking the "first level" as a relatively high level and the "second level" as a relatively low level. The skilled in the art will appreciate that the present disclosure is not limited thereto.

FIG. 1 is a schematic structure diagram of an ultrasonic fingerprint recognition system. For example, the ultrasonic fingerprint recognition system as shown in FIG. 1 may be arranged on a display area of a display panel. As shown in FIG. 1, the ultrasonic fingerprint recognition system 10 may include a driving circuit 110, a transducing circuit 120, a collection circuit 130, a first switch S1, and a second switch S2. An upper electrode of the transducing circuit 120 is connected to the driving circuit 110 and is grounded via the first switch S1. A lower electrode of the transducing circuit 120 is connected to the collection circuit 130 and is grounded via the second switch S2. It will be understood by the skilled in the art that in the ultrasonic fingerprint recognition system 10 as shown in FIG. 1, the driving circuit 110 and a part of the transducing circuit 120 function to transmit signals, and the collection circuit 130 and another part of the transducing circuit 120 function to receive signals. Next, the operations of the ultrasonic fingerprint recognition system 10 will be described in detail.

During a first time period, the first switch S1 is turned on, the second switch S2 is turned off, and the driving circuit 110 inputs a high frequency signal via the first electrode 1201 of the transducing circuit 120. Under the action of the high frequency signal, the transducing circuit 120 generates mechanical oscillations and transmits ultrasonic waves outside as a wave source. A part of the ultrasonic waves may be reflected to the transducer circuit 120 by valleys and ridges of the fingerprint after the ultrasonic waves reach the dermis layer of the finger. During a second time period, the first switch S1 is turned off, the second switch S2 is turned on, and the transducing circuit 120 converts the echo signals reflected by the valleys and ridges of the received fingerprint into corresponding electrical signals, and outputs to the collection circuit 130 via the second electrode 1202. The collection circuit 130 reads the input electrical signal, performs an accumulative amplification operation and outputs to the processing apparatus to generate a grayscale image of the fingerprint. For example, the transducing circuit 120 may be implemented using a PolyVinyliDene Fluoride (PVDF) film. Of course, other piezoelectric materials may also be used to implement the transducing circuit 120. In addition, for the sake of clarity, the expressions "first electrode" and "second electrode" are used above, and the skilled in the art may understand that they may be implemented as thin films substantially, or as a single structure, as long as they (it) may transmit and receive ultrasonic waves at different times.

However, the ultrasonic fingerprint recognition system 10 in FIG. 1 has problems such as a poor accumulative amplification effect, a short holding time of the echo electrical signal, etc., resulting in a lower signal-to-noise ratio of the output amplified signal, so that it is difficult for the processing apparatus to generate the grayscale image of the fingerprint. The inventors have found that this is due to the fact that it is difficult for the conventional collection circuit to accumulatively amplify the echo electrical signal. In addition, there is a problem that the output signal of the signal collection circuit is difficult to be held.

Figure 2A:
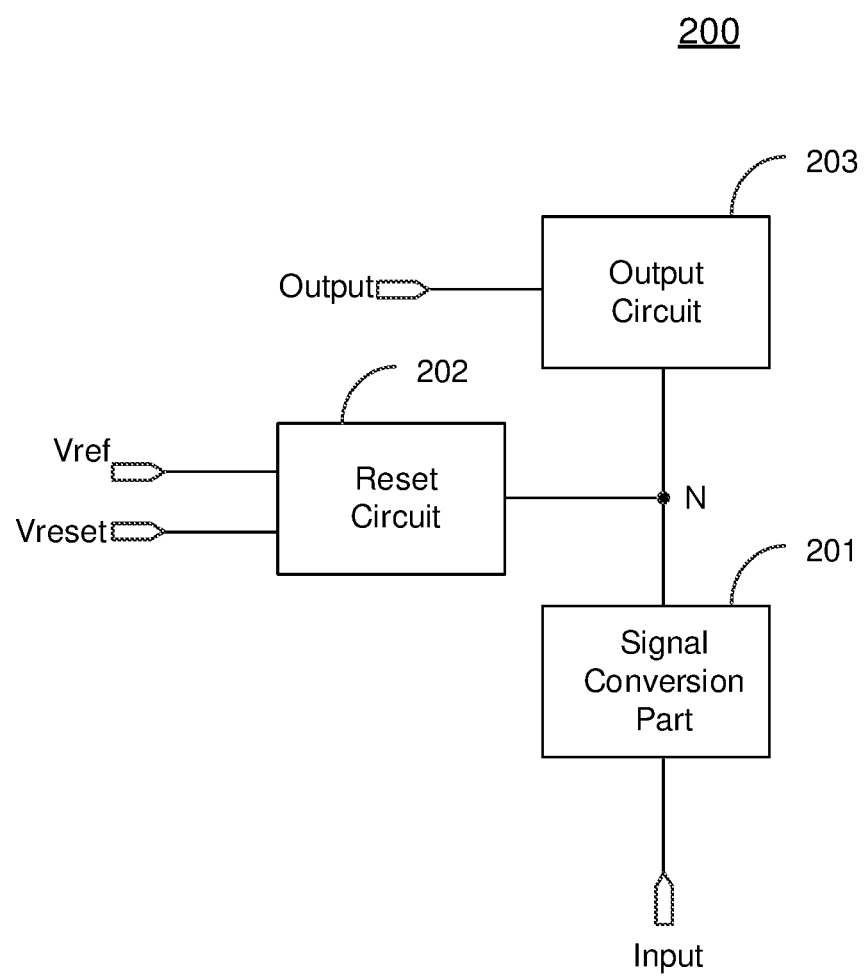
FIG. 2A shows a schematic structure diagram of an exemplary signal receiving circuit according to an embodiment of the present disclosure.

FIG. 2A shows a schematic structure diagram of a signal receiving circuit according to an embodiment of the present disclosure. As shown in FIG. 2A, the signal receiving circuit 200 may include a signal conversion part 201 configured to convert a received input signal "Input" into an electrical signal and output it to the collecting node N. The signal receiving circuit 200 may also include a reset circuit 202 having an input terminal connected to a reference signal line for providing a reference voltage signal Vref, a control terminal connected to a reset signal line for providing a reset signal Vreset, and an output terminal connected to the collection node N. The reset circuit 202 is configured to control the voltage of the signal at the collection node N under the control of the reset signal Vreset. The signal receiving circuit 20 may also include an output circuit 203. The input terminal of the output circuit 203 is connected to the collection node N, and the output circuit 203 is configured to accumulatively amplify the signal at the collection node N, and output the amplified signal at the output terminal "Output" of the signal receiving circuit 20.

For example, the input signal may be an ultrasonic signal. The skilled in the art may understand that the input signal may also be other types of signals, such as an infrared signal, a visible light signal, etc., and the embodiments of the present disclosure are not limited thereto. Further, although it is shown in the drawings that the input signal Input is received by the signal conversion part 201 at an input terminal, the skilled in the art may understand that the signal conversion part 201 may receive the echo signal as the input signal in various forms. For example, in a case where the signal conversion part is implemented as a piezoelectric thin film, the input signal may be received via the surface of the piezoelectric thin film.

Figure 2B:
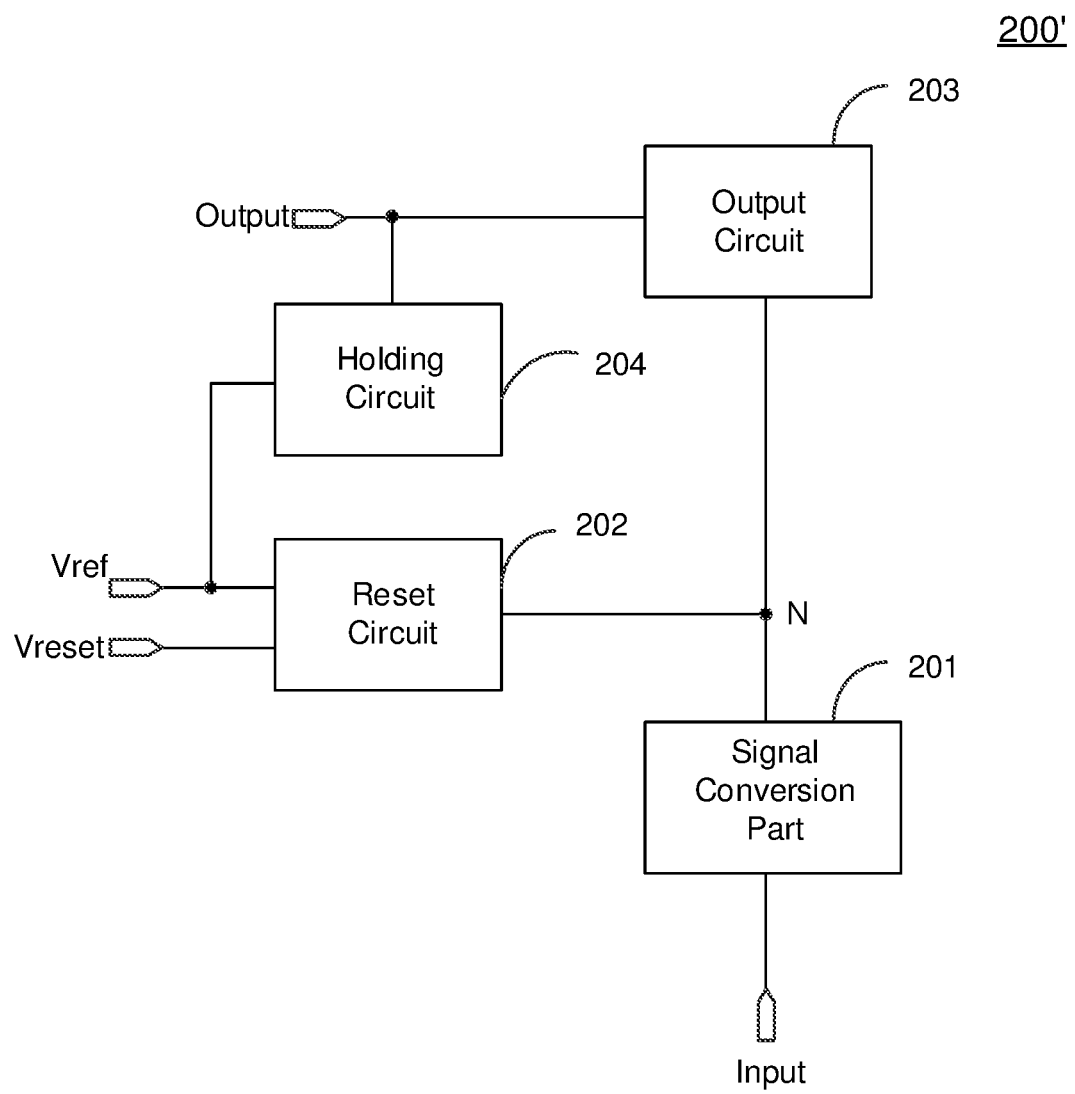
FIG. 2B shows a schematic structure diagram of another exemplary signal receiving circuit according to an embodiment of the present disclosure.

FIG. 2B shows a schematic structure diagram of another exemplary signal receiving circuit according to an embodiment of the present disclosure. As shown in FIG. 2B, in addition to the signal conversion part 201, the reset circuit 202, and the output circuit 203 according to the embodiment of the present disclosure, the signal receiving circuit 200' may further include a holding circuit 204. The holding circuit 204 has a first terminal connected to the reference signal line, and a second terminal connected to an output terminal "Output" of the signal receiving circuit, and the holding circuit 204 is configured to hold the voltage at the output terminal "Output" using the reference voltage signal. For example, the holding circuit 204 may be configured to hold the voltage at the output terminal "Output" to be not lower than a predetermined value.

For example, the holding circuit 204 may be implemented as one or more capacitors.

Figure 3A:
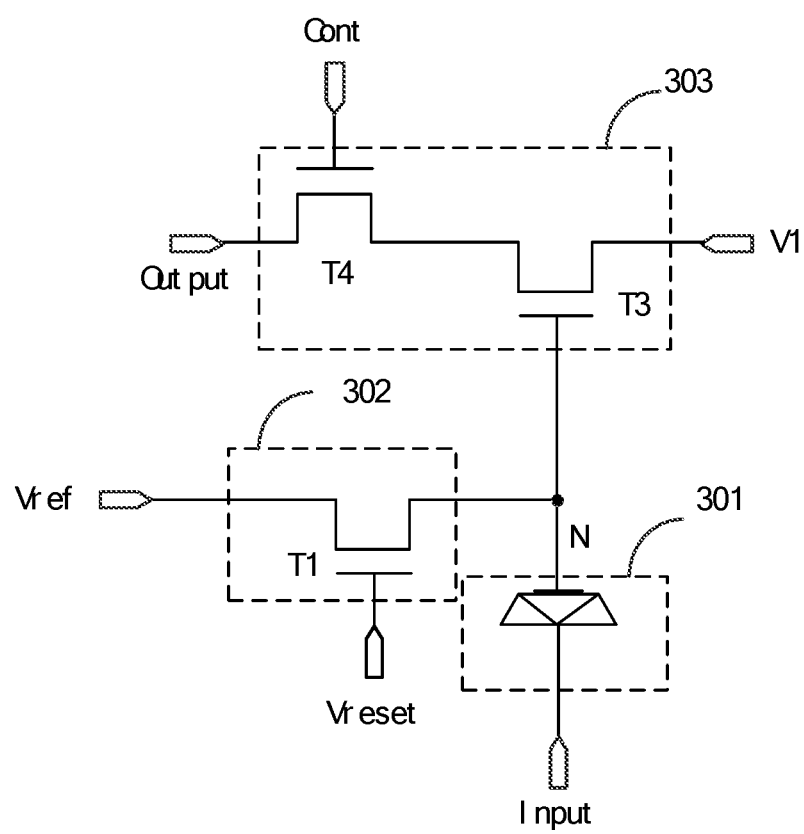
FIG. 3A shows a schematic circuit diagram of an exemplary signal receiving circuit according to an embodiment of the present disclosure.

FIG. 3A shows a schematic circuit diagram of an exemplary signal receiving circuit according to an embodiment of the present disclosure. As shown in FIG. 3A, in the signal receiving circuit 300 according to the embodiment of the present disclosure, the reset circuit 302 may include a first transistor T1. The first transistor T1 has a gate connected to the reset signal line, a first electrode connected to the reference signal line, and a second electrode is connected to the collection node N. The first transistor T1 is configured to compensate for the voltage of the signal at the collection node N with the reference voltage signal Vref.

As shown in FIG. 3A, the output circuit 303 may include a third transistor T3 and a fourth transistor T4. The third transistor T3 has a gate connected to the collection node N, a first electrode connected to a first power supply line for providing a first voltage V1, and a second electrode connected to a first electrode of the fourth transistor T4. The third transistor T3 is configured to accumulatively amplify the signal at the collection node N. A gate of the fourth transistor T4 is connected to a control signal line for providing a control signal Cont, and the fourth transistor is configured to output the amplified signal from the second electrode under the control of the control signal Cont.

According to an embodiment of the present disclosure, the first transistor T1 may be a depleted thin film transistor. The third transistor T3 and the fourth transistor T4 are both enhanced transistors. Usually, the Vth of the P-type transistor is a negative voltage, and the Vth of the N-type transistor is a positive voltage. However, the Vth of the depleted N-type transistor may be implemented as a negative voltage, such as −12V. Thus, even if the voltage applied to the gate of the first transistor T1 is a negative voltage, the first transistor T1 may be turned on. In addition, T1, T3, and T4 may be N-type transistors or P-type transistors. The skilled in the art may appreciate that N-type transistors may be used for all the transistors since the N-type transistor has a higher mobility.

Figure 3B:
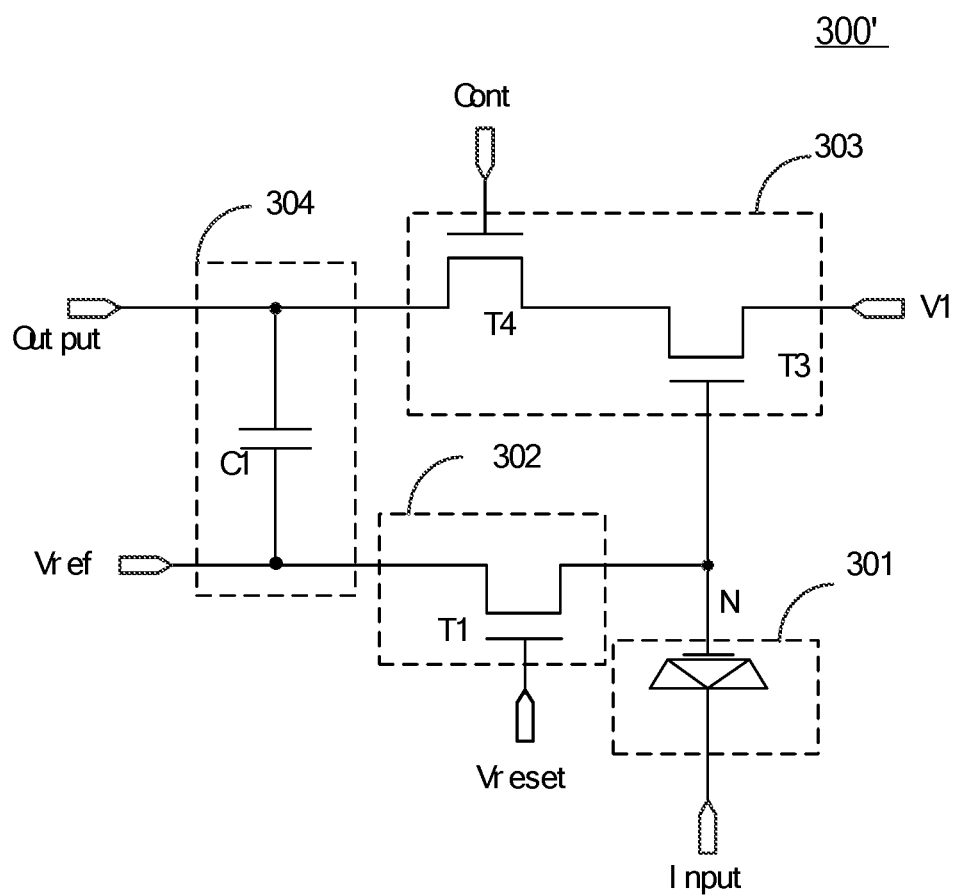
FIG. 3B shows a schematic circuit diagram of another exemplary signal receiving circuit according to an embodiment of the present disclosure.

FIG. 3B shows a schematic circuit diagram of another exemplary signal receiving circuit according to an embodiment of the present disclosure. The signal receiving circuit 300' according to the embodiment of the present disclosure may further include a holding circuit 304 implemented as a first capacitor C1. A first terminal of the first capacitor C1 is connected to the reference signal line, and a second terminal thereof is connected to the output terminal Output of the signal receiving circuit. The first capacitor C1 is configured to hold the voltage of the output terminal Output using the voltage of the reference voltage signal. For example, the first capacitor C1 is configured such that the amplitude of the signal of the output terminal Output is not lower than a predetermined value. The skilled in the art may understand that a capacitance value of the first capacitor C1 may be set according to a fingerprint recognition resolution of a panel on which the signal receiving circuit is arranged, a writing period duration of the signal receiving circuit, and the like, and the "predetermined value" is further set so that a desired signal can be obtained at the output terminal Output for subsequent processing in the writing period of the signal receiving circuit, which is not limited by the present disclosure. In an example, when the reference voltage signal Vref is 5V and the reset signal Vreset is 5V, the capacitance value of the first capacitor C1 is set such that the "predetermined value" is not lower than 3V.

Moreover, the skilled in the art will appreciate that although the first capacitor C1 is illustrated as a single capacitor in FIG. 3B, it may be implemented as a plurality of capacitors connected in parallel or in series, which is not limited by the present disclosure.

Further, similar to the example in FIG. 3A, the first transistor T1 has the gate connected to the reset signal line, the first electrode connected to the reference signal line, and the second electrode connected to the collection node N. The output circuit 303 may include the third transistor T3 and the fourth transistor T4. The third transistor T3 has the gate connected to the collection node N, the first electrode connected to the first power supply line for providing the first voltage V1, and the second electrode connected to the first electrode of the fourth transistor T4. The gate of the fourth transistor T4 is connected to the control signal line for providing the control signal Cont. These will not be repeatedly described for the sake of brevity.

Figure 3C:
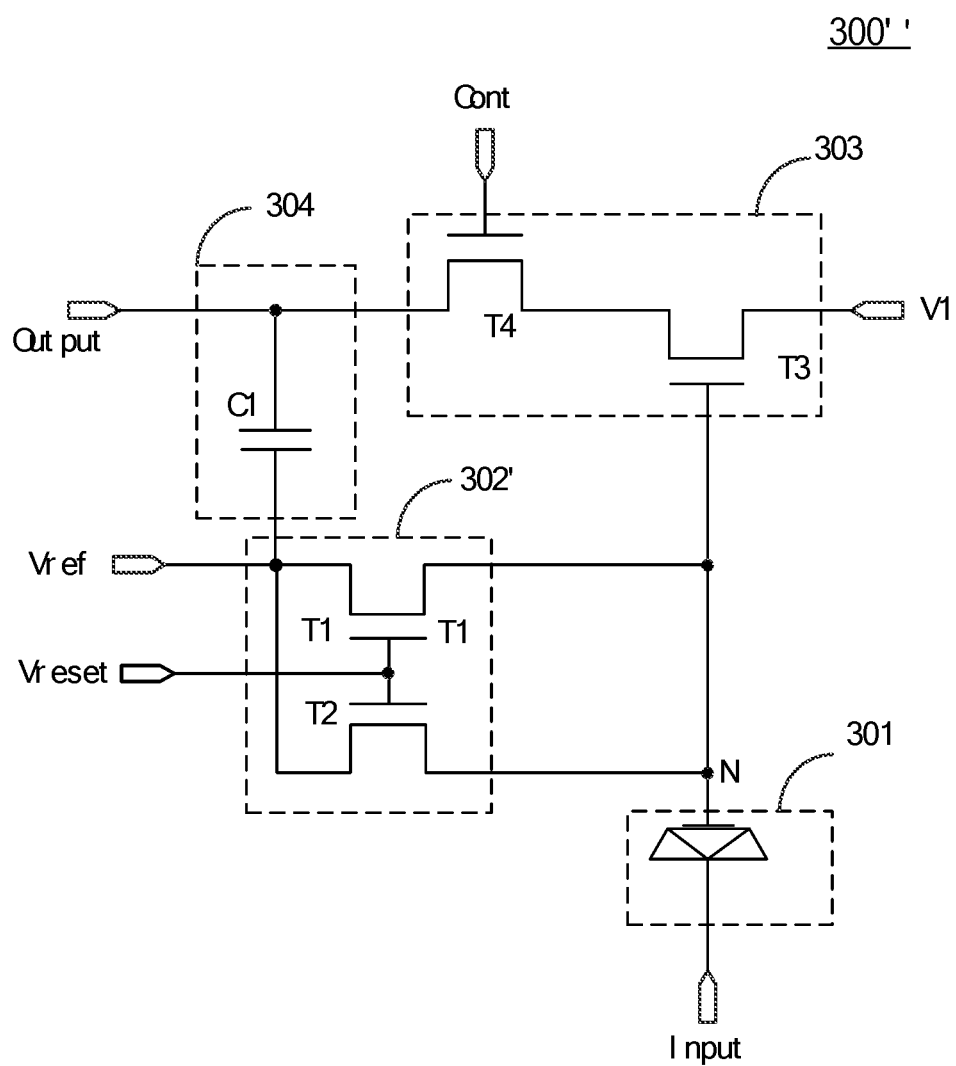
FIG. 3C shows a schematic circuit diagram of another exemplary signal receiving circuit according to an embodiment of the present disclosure.

FIG. 3C shows a schematic circuit diagram of another exemplary signal receiving circuit according to an embodiment of the present disclosure. As shown in FIG. 3C, in the signal receiving circuit 300" according to an embodiment of the present disclosure, the reset circuit 302' may further include a second transistor T2 in addition to the first transistor T1. The second transistor T2 has a gate connected to the reset signal line, a first electrode connected to the reference signal line, and a second electrode connected to the collection node N.

Further, similar to the examples in FIGS. 3A and 3B, the first transistor T1 in FIG. 3C has the gate connected to the reset signal line, the first electrode connected to the reference signal line, and the second electrode connected to the collection node N. The output circuit 303 may include a third transistor T3 and a fourth transistor T4. The third transistor T3 has a gate connected to the collection node N, the first electrode connected to the first power supply line for providing the first voltage V1, and the second electrode connected to the first electrode of the fourth transistor T4. The gate of the fourth transistor T4 is connected to the control signal line for providing the control signal Cont. These will not be repeatedly described for the sake of brevity.

According to an embodiment of the present disclosure, the first transistor T1 may be a depleted thin film transistor. The second transistor T2, the third transistor T3, and the fourth transistor T4 are all enhanced transistors. Since the first transistor T1 is a depleted thin film transistor, when the reset signal Vreset is at a high level, the first transistor T1 cannot be completely turned on, so the voltage output to the N node from the second electrode of the first transistor T1 may be slightly lower than the reference voltage Vref input to the first electrode of the first transistor T1. Therefore, by additionally providing an enhanced second transistor T2, it is possible to ensure that the voltage at the N node is set to be the reference voltage Vref as expected. Further, T1, T2, T3, and T4 may be N-type transistors or P-type transistors. The skilled in the art may appreciate that N-type transistors may be used for all the transistors since the N-type transistor has a higher mobility.

Figure 4:
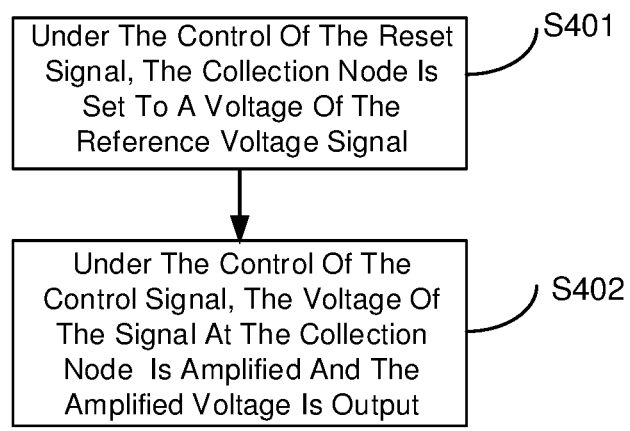
FIG. 4 shows a flowchart of a method of driving a signal receiving circuit according to an embodiment of the present disclosure.

FIG. 4 shows a flowchart of a method of driving a signal receiving circuit according to an embodiment of the present disclosure. As shown in FIG. 4, the method 40 of driving the signal receiving circuit according to the embodiment of the present disclosure may include the following steps. It should be noted that the serial numbers of the respective steps in the following method are only used to denote the steps for ease of description, but should not be regarded as indicating the execution order of the respective steps. This method does not need to be performed exactly as shown, unless explicitly stated.

In step 401, during the first time period, the collection node is set to the voltage of the reference voltage signal under the control of the reset signal.

In step 402, during the second time period, the voltage of the signal at the collection node is accumulatively amplified and the amplified voltage is output, under the control of the control signal.

Figure 5:
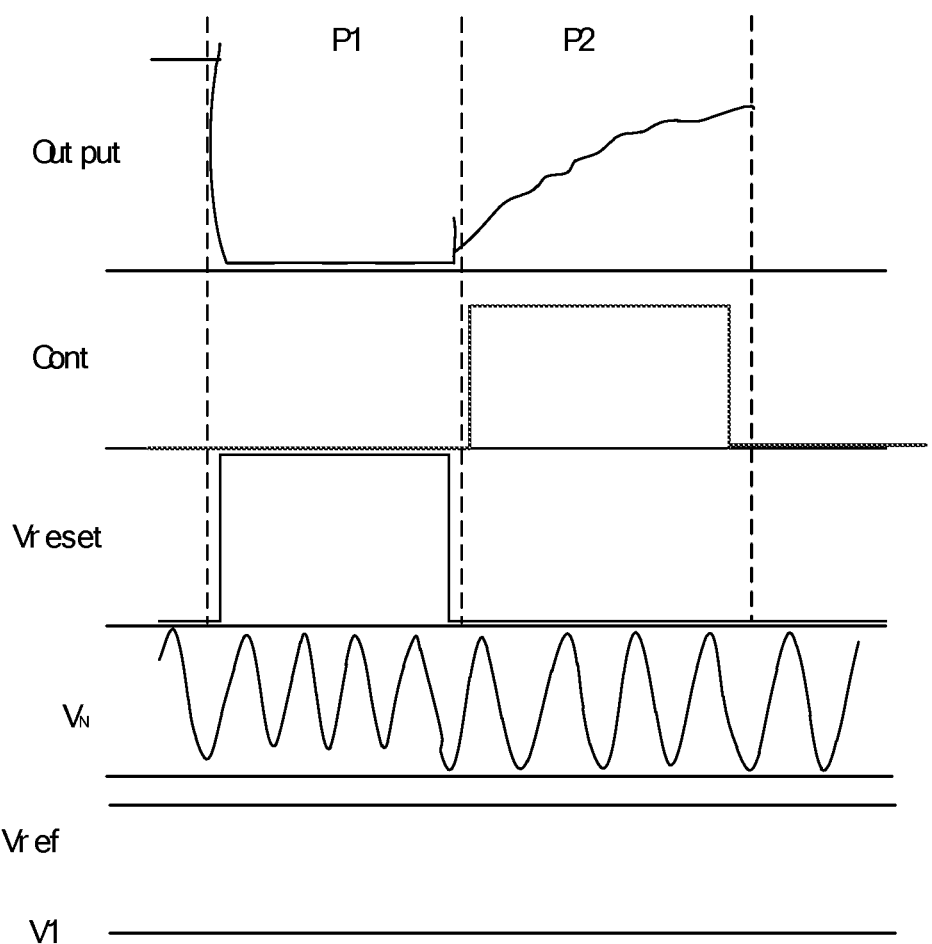
FIG. 5 shows a driving timing diagram of a signal receiving circuit according to an embodiment of the present disclosure.
Figure 6A:
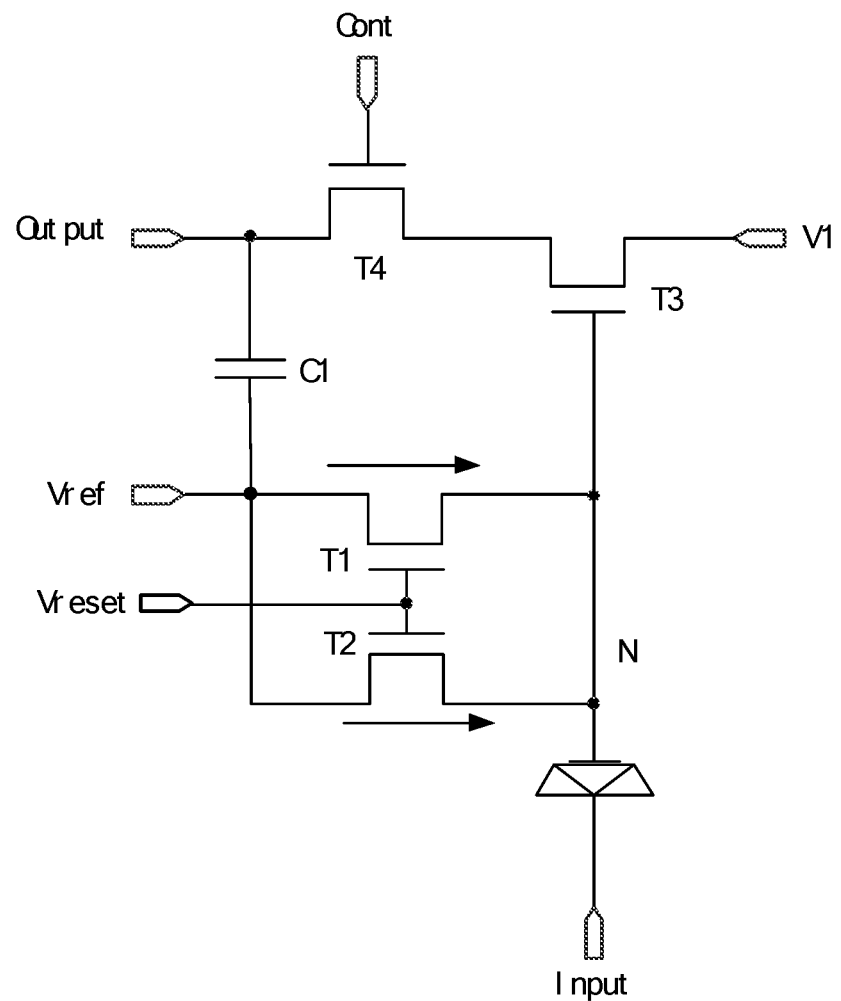
FIG. 6A shows an equivalent circuit diagram of a pixel driving circuit during a first time period according to an embodiment of the present disclosure.
Figure 6B:
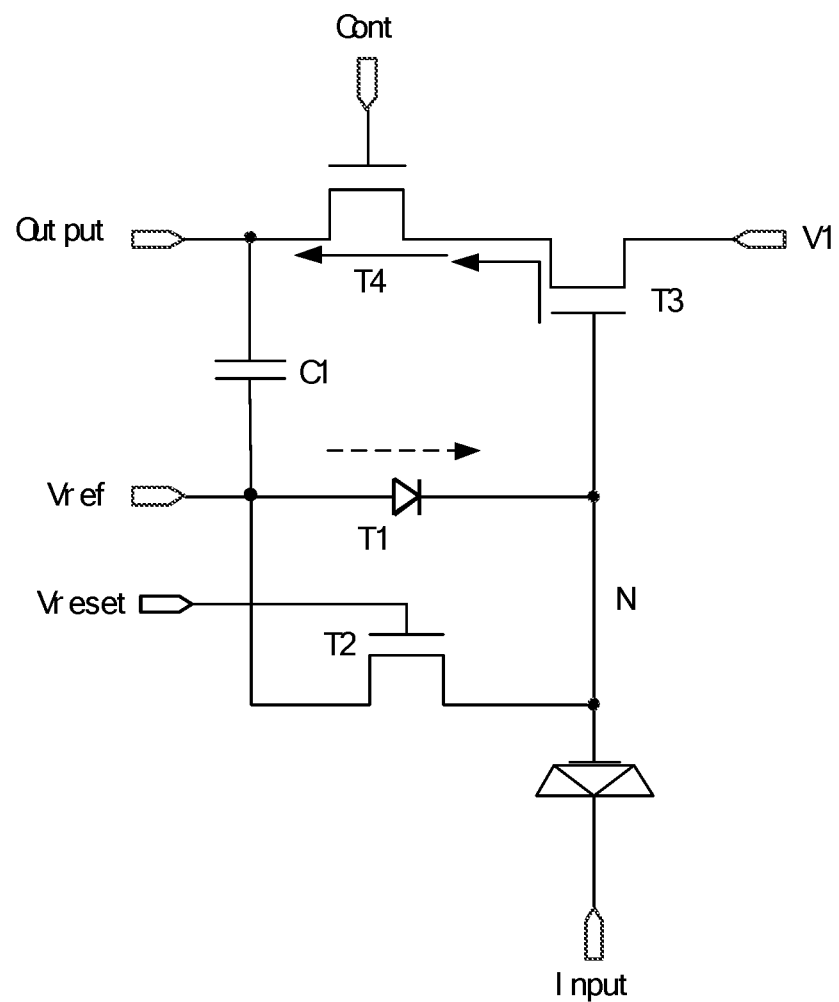
FIG. 6B shows an equivalent circuit diagram of a pixel driving circuit during a second time period according to an embodiment of the present disclosure.

FIG. 5 shows a driving timing diagram of a signal receiving circuit according to an embodiment of the present disclosure, FIG. 6A shows an equivalent circuit diagram of a pixel driving circuit during a first time period according to an embodiment of the present disclosure, and FIG. 6B shows an equivalent circuit diagram of a pixel driving circuit during a second time period according to an embodiment of the present disclosure. Next, the operations of the signal receiving circuit according to an embodiment of the present disclosure will be described in detail with reference to FIGS. 3C, 4, 5, 6A, and 6B. In the following example, all the transistors are N-type thin film transistors as an example, in which the first transistor T1 is a depleted transistor. The skilled in the art will appreciate that the embodiment of the present disclosure may obviously be applied to the case where all the transistors are P-type thin film transistors. For convenience of description, in the following example, the reference voltage Vref may be 5V, the reset voltage Vreset may be 5V, and the power supply voltage V1 may be 12V. Further, the directions of the arrows in FIGS. 6A and 6B indicate current directions.

As shown in FIG. 5, during the first time period P1, the reset signal Vreset is at a first level, in this example, a high level, and the control signal Cont is at a second level, which is a low level in this example. As shown in FIG. 6A, under the control of the reset signal Vreset, the first transistor T1 is turned on, and the second transistor T2 is turned on, so that the voltage VN of the collection node N is set to the voltage of the reference voltage signal Vref, for example, 5V. Therefore, the first time period P1 may be referred to as a "reset phase". Since the control signal Cont is at a low level, the fourth transistor T4 is turned off. It should be noted that since the first transistor T1 is a depleted transistor, the voltage VN of the collection node N may be set to the voltage of the reference voltage signal Vref by additionally providing an enhanced second transistor T2. In addition, during the first time period P1, the first terminal of the first capacitor C1 is at a high level Vref, and the first capacitor C1 is charged.

Next, during the second time period P2, the reset signal Vreset is at the second level, and the control signal Cont is at the first level, which is a low level in this example. As shown in FIG. 6B, under the control of the control signal Cont, the fourth transistor T4 is turned on. The second transistor T2 is turned off, and the third transistor T3 operates in an amplified state to accumulatively amplify the signal voltage input from its gate, and outputs it to the output terminal Output via the turned-on fourth transistor T4. It will be understood by the skilled in the art that during the second time period P2, the signal Vg input to the gate of the third transistor T3 is substantially a sum of the voltage of the electrical signal corresponding to, for example, the echo signal which is input during this time period and the voltage VN of the collection node. The third transistor T3 substantially accumulatively amplifies the signal Vg (i.e., an integration process). Therefore, the second time period P2 may be referred to as a "writing phase".

Although the voltage Vreset input to the gate of the first transistor T1 is at a low level at this time, since the first transistor T1 is a depleted transistor, the first transistor T1 substantially forms a diode, the voltage at one terminal of the diode being the voltage of the reference voltage signal Vref, and the voltage at the other terminal thereof being the voltage at the collection node VN. When VN is lower than Vref, the diode is turned on, so that the voltage at the collection node may be increased. When VN is greater than Vref, the diode is turned off. Therefore, it may be ensured that during the second time period P2, the voltage at the collecting node VN is not lower than the voltage of the reference voltage signal Vref, thereby ensuring that the voltage Vg input to the gate of the third transistor T3 is higher, so that the signal receiving circuit may output an output signal with a higher signal-to-noise ratio.

Further, since the first capacitor C1 is charged during both the first time period P1 and the second time period P2, the output terminal Output may be held at a higher potential.

According to the technical solution of the embodiment of the present disclosure, the use of the depleted thin film transistor in the signal receiving circuit improves the accumulative amplification effect of the echo signal, prevents the signal-to-noise ratio from being too low due to the amplitude of the echo signal being too small. Further, according to the embodiment of the present disclosure, attenuation of the echo signal may be further avoided by using the holding function of the holding circuit. Therefore, it is applicable to realize the fingerprint recognition in the entire display screen area.

Figure 7:
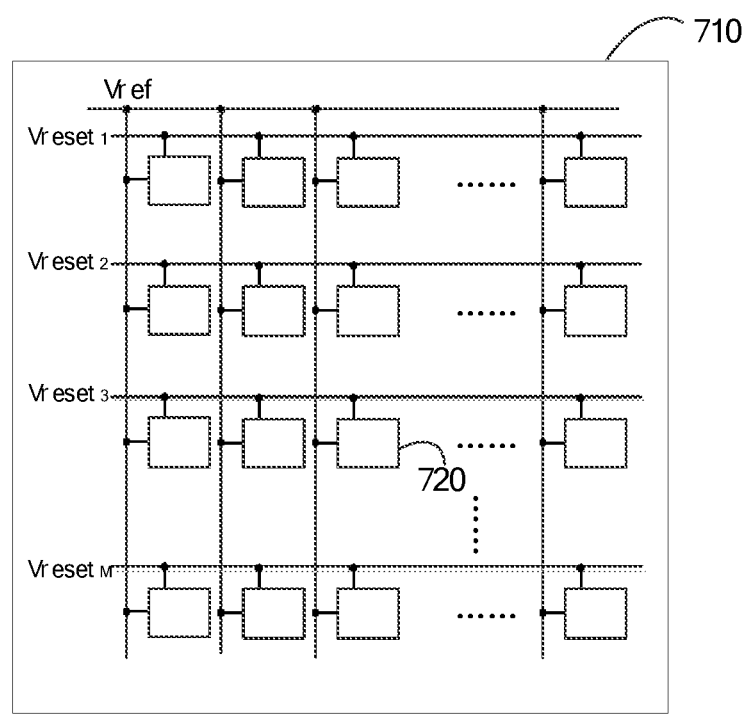
FIG. 7 shows a schematic structure diagram of a display panel according to an embodiment of the present disclosure.

FIG. 7 shows a schematic structure diagram of a display panel according to an embodiment of the present disclosure. As shown in FIG. 7, a display panel 70 according to the embodiment of the present disclosure may include: a display substrate 710; a signal transmitting circuit; and a plurality of signal receiving circuits 720 according to the embodiment of the present disclosure which are arranged in an array.

It will be understood by the skilled in the art that FIG. 7 is a top view, and thus the signal transmitting circuit is not shown. In addition, the array of the signal receiving circuits 720 may be arranged in the display area of the display panel according to the desired fingerprint recognition resolution. In addition, other driving signals used in the display panel may be used as the Vref signal and the first voltage V1, etc., of the embodiment of the present disclosure, and/or signal lines may be additionally provided to implement the driving of the signal receiving circuit according to the embodiment of the present disclosure. The present disclosure is not limited thereto.

Figure 8:
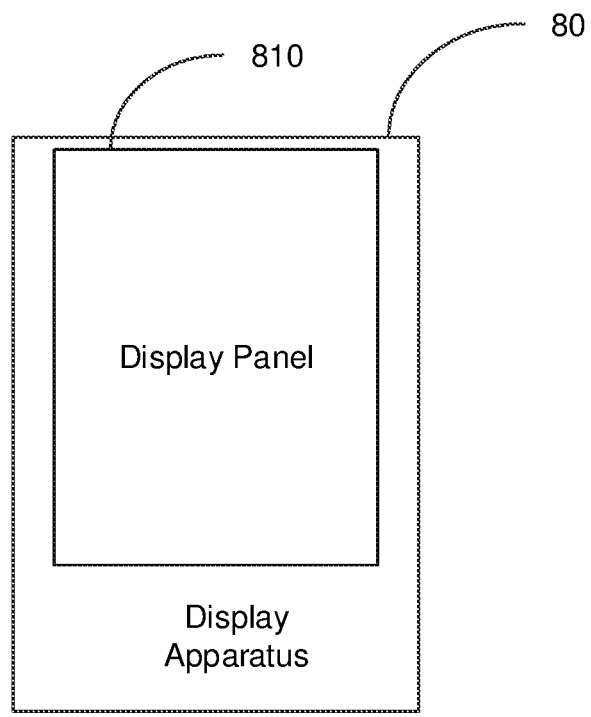
FIG. 8 shows a schematic structure diagram of a display apparatus according to an embodiment of the present disclosure.

According to an embodiment of the present disclosure, a display apparatus is provided. FIG. 8 shows a schematic structure diagram of a display apparatus according to an embodiment of the present disclosure. As shown in FIG. 8, a display apparatus 80 according to an embodiment of the present disclosure may include a display panel 810 according to the embodiment of the present disclosure. The display apparatus 80 according to the embodiment of the present disclosure may be any product or component having a display function, such as an e-paper, a mobile phone, a tablet, a display, a notebook computer, a digital photo frame, a navigator, or the like.

It should be noted that, in the above description, the technical solutions of the embodiments of the present disclosure are shown by way of example only, but the embodiments of the present disclosure are not limited to the above steps and structures. Where possible, steps and structures may be adjusted and added or removed as needed. Therefore, certain steps and units are not essential elements for implementing the general inventive concept of the embodiments of the present disclosure.

The present disclosure has been described in connection with the preferred embodiments. It will be appreciated that various other changes, substitutions and additions may be made by those skilled in the art without departing from the spirit and scope of the embodiments. Therefore, the scope of the embodiments of the present disclosure is not limited to the specific embodiments described above, but is defined by the appended claims.

We claim:

1. A signal receiving circuit, comprising:
a reset circuit having an input terminal connected to a reference signal line for providing a reference voltage signal, a control terminal connected to a reset signal line providing a reset signal, and an output terminal connected to a collection node, the reset circuit being configured to control a voltage of a signal at the collection node under control of the reset signal; and
an output circuit having an input terminal connected to the collection node, the output circuit being configured to accumulatively amplify the signal at the collection node and output the amplified signal at an output terminal of the signal collection circuit,
wherein the reset circuit comprises a first transistor and a second transistor,
wherein the first transistor has a gate connected to the reset signal line, a first electrode connected to the reference signal line, and a second electrode connected to the collection node; and the first transistor is configured to compensate for the voltage of the signal at the collection node with the reference voltage signal,
wherein the second transistor has a gate connected to the reset signal line, a first electrode connected to the reference signal line, and a second electrode connected to the collection node, and
wherein the first transistor is a depleted thin film transistor, and the second transistor is an enhanced thin film transistor.

2. The signal receiving circuit according to claim 1, wherein the output circuit comprises a third transistor and a fourth transistor;
wherein the third transistor has a gate connected to the collection node, a first electrode connected to a power supply line for providing a power supply voltage, a second electrode connected to a first electrode of the fourth transistor; and the third transistor is configured to accumulatively amplify the signal at the collection node; and
the fourth transistor has a gate connected to a control signal line for providing a control signal and a second electrode connected to the output terminal of the signal receiving circuit; and the fourth transistor is configured to output the amplified signal under control of the control signal.

3. The signal receiving circuit according to claim 2, wherein the first to fourth transistors are N-type thin film transistors.

4. The signal receiving circuit according to claim 1, further comprising a holding circuit having a first terminal connected to the reference signal line and a second terminal connected to the output terminal of the signal receiving circuit; and the holding circuit is configured to hold the voltage at the output of the signal receiving circuit using the reference voltage signal.

5. The signal receiving circuit according to claim 1, further comprising: a signal conversion part configured to convert the received input signal into an electrical signal and output to the collection node.

6. The signal receiving circuit according to claim 5, wherein the input signal is an ultrasonic signal.

7. The signal receiving circuit according to claim 5, wherein the signal conversion part is a piezoelectric thin film.

8. A display panel, comprising:
a plurality of signal receiving circuits according to claim 1 arranged in an array in a display area of the display panel.

9. A display apparatus comprising the display panel according to claim 8.

10. A method of driving a signal receiving circuit, wherein:
the signal receiving circuit, comprises:
a reset circuit having an input terminal connected to a reference signal line for providing a reference voltage signal, a control terminal connected to a reset signal line providing a reset signal, and an output terminal connected to a collection node, the reset circuit being configured to control a voltage of a signal at the collection node under control of the reset signal;
an output circuit having an input terminal connected to the collection node, the output circuit being configured to accumulatively amplify the signal at the collection node and output the amplified signal at an output terminal of a signal collection circuit; and
a first transistor, wherein the first transistor has a gate connected to the reset signal line, a first electrode connected to the reference signal line, and a second electrode connected to the collection node; the first transistor is configured to compensate for the voltage of the signal at the collection node with the reference voltage signal; and the first transistor is a depleted thin film transistor; and
the reset circuit comprises a second transistor; and the second transistor has a gate connected to the reset signal line, a first electrode connected to the reference signal line, and a second electrode connected to the collection node; and the second transistor is an enhanced thin film transistor;
the method comprising:
during a first time period, applying the reset signal so as to set the collection node to a voltage of the reference voltage signal; and
during a second time period, applying the control signal so as to accumulatively amplify the voltage of the signal at the collection node and output the amplified voltage.

11. The method according to claim 10, wherein the first transistor and the second transistor are turned on under the control of the reset signal during the first time period.

12. The method according to claim 10, wherein the first transistor compensates for the voltage of the signal at the collection node with the reference voltage signal under the control of the reset signal during the first time period.

13. The method according to claim 10, wherein the reset signal is at a first level, and the control signal is at a second level different from the first level.

* * * * *